(12) United States Patent  (10) Patent No.: US 8,706,372 B2
Cetinkaya et al.  (45) Date of Patent: Apr. 22, 2014

(54) METHOD FOR ADJUSTING A BRAKE SYSTEM OF A VEHICLE IN THE EVENT OF A COLLISION

(75) Inventors: Ferah Cetinkaya, Ilsfeld (DE); Sybille Eisele, Hessigheim (DE); Michael Schmid, Kornwestheim (DE); Ralf Schaeffler, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 12/998,361

(22) PCT Filed: Aug. 25, 2009

(86) PCT No.: PCT/EP2009/060943
§ 371 (c)(1),
(2), (4) Date: Jul. 15, 2011

(87) PCT Pub. No.: WO2010/046160
PCT Pub. Date: Apr. 29, 2010

(65) Prior Publication Data
US 2011/0264348 A1  Oct. 27, 2011

(30) Foreign Application Priority Data

Oct. 20, 2008 (DE) .......................... 10 2008 042 962

(51) Int. Cl.
*G06F 7/70* (2006.01)
(52) U.S. Cl.
USPC ................... 701/70; 701/71; 701/66; 701/78; 303/125

(58) Field of Classification Search
USPC ............ 701/70, 71, 66, 78, 83; 303/124, 125; 340/903
See application file for complete search history.

(56) References Cited

U.S. PATENT DOCUMENTS

| | | | |
|---|---|---|---|
| 5,447,363 A * | 9/1995 | Fukamachi | 303/125 |
| 6,364,433 B1 * | 4/2002 | Stemer | 303/138 |
| 2002/0020575 A1 | 2/2002 | DeLuca et al. | |
| 2005/0052077 A1 * | 3/2005 | Quirant et al. | 303/115.2 |

FOREIGN PATENT DOCUMENTS

| | | |
|---|---|---|
| DE | 197 53 971 | 6/1999 |
| DE | 10 2004 058 814 | 6/2006 |
| DE | 10 2004 062 496 | 7/2006 |
| DE | 10 2005 039 307 | 3/2007 |
| DE | 10 2006 036 218 | 10/2007 |
| EP | 1 010 596 | 6/2000 |
| EP | 1 852 323 | 11/2007 |
| JP | 2000-219111 | 8/2000 |
| JP | 2008-137587 | 6/2008 |
| JP | 2008-525254 | 7/2008 |
| WO | WO 2007/113135 | 10/2007 |
| WO | WO 2007/115923 | 10/2007 |

* cited by examiner

*Primary Examiner* — Gertrude Arthur Jeanglaude
(74) *Attorney, Agent, or Firm* — Kenyon & Kenyon LLP

(57) ABSTRACT

In a method for adjusting a brake system of a vehicle, braking power is automatically built up in the event of a collision. The automatic buildup of the braking power may be terminated by a defined driver response when the actuation of a driving pedal of the vehicle at a defined intensity and for a minimum period of time is maintained by the driver.

15 Claims, 6 Drawing Sheets

METHOD FOR ADJUSTING A BRAKE SYSTEM OF A VEHICLE IN THE EVENT OF A COLLISION

BACKGROUND OF THE INVENTION

1. Field of the Invention

The present invention relates to a method for adjusting a brake system of a vehicle.

2. Description of Related Art

A method is known from published German patent application document DE 197 53 971 A1 for controlling a brake system of a vehicle, with the aid of which braking power is automatically built up beyond the level specified by the driver when a collision situation is recognized. As a result of the automatic buildup of the braking power, in the event of a collision, the severity of the accident is reduced, or a consequential accident is prevented. Due to the additional braking power, the vehicle remains at a standstill or is brought to a standstill in a shorter time.

The automatic buildup of the braking power may be terminated by a defined driver response. For this purpose, various conditions are formulated which must be alternatively met in order for the automatic buildup of braking power to be terminated. As a criterion it is stated in published German patent application document DE 197 53 971 A1 that the driver releases the brake pedal and/or the parking brake if at the same time the vehicle speed drops below a minimum value. In addition, the automatic buildup of braking power is terminated when the gas pedal is actuated. The basis for this procedure is that the driver, as the result of a conscious response, regains control solely by actuating and controlling the vehicle.

However, it must be taken into account that actuation of a driving pedal by the driver in the event of a collision, i.e., actuation of the accelerator pedal or the brake pedal, must not necessarily be based on a conscious response of the driver in every case. In addition, as the result of panic reactions the driver may actuate the pedals, which deactivates the automatic buildup of braking power, even when this results in a more hazardous traffic situation than if the automatic generation of braking power were continued.

BRIEF SUMMARY OF THE INVENTION

An object of the present invention is to reduce the severity of accidents in the event of a collision of the vehicle.

In the method according to the present invention for adjusting a brake system of a vehicle, in the event of a collision, braking power is automatically built up to either reduce the speed of the vehicle as quickly as possible, or, if the vehicle is already at a standstill at the moment of the collision, to reduce the motion of the vehicle resulting from the collision impulse and bring the vehicle to a standstill. The braking power is automatically built up as the result of being acted on by the brake system; the brake system may include a hydraulic brake unit, an electrohydraulic brake unit, an electric motor brake unit, or possibly an electropneumatic brake unit. The brake units are adjusted by actuating signals of a regulation and control device, for example an electronic stability program (ESP) control device. The information concerning a collision which has occurred or which is imminent is sent to the regulation and control device via a sensor system of the vehicle, for example an environmental sensor system, for example radar-assisted sensors, LIDAR sensors, ultrasonic sensors, or optical sensors, with the aid of which an impact to the vehicle may be detected. The sensors may also be driving state sensors, via which one or multiple state variables concerning the longitudinal and transverse dynamics may be ascertained, such as the vehicle speed, longitudinal acceleration, transverse acceleration, yaw rate, or wheel slip, for example. Lastly, signals of an airbag sensor system may also be processed automatically in that braking power is built up as soon as one or multiple airbags in the vehicle have been deployed.

To ensure driver autonomy to the greatest extent possible and largely give control of the vehicle to the driver, in the event of a collision and the automatic buildup of braking power, certain driver responses are established which result in termination of the automatic buildup of braking power. In the determination as to whether a driver response results in termination or continuation of the buildup of braking power, i.e., generation of braking power, the advantage of driver control must be weighed against a possible disadvantage due to the termination of the automatic generation of braking power. Therefore, to avoid additional hazard as a result of the termination, the driver responses are established in such in a way that a conscious override, and the accompanying termination of the automatic buildup of braking power, may be distinguished from a panic reaction of the driver with the greatest possible reliability.

According to the present invention, the automatic buildup of braking power is terminated when the actuation of a driving pedal of a vehicle, i.e., the actuation of the brake pedal, the accelerator, i.e., gas pedal, and/or a clutch pedal if present, as well as a pedal for a parking brake, is maintained by the driver at a defined intensity and for a minimum actuation time period. In this case, a conscious driver response may be assumed with a high degree of probability, which justifies transferring the control of the vehicle dynamics from the automatically acting brake system back to the driver. In contrast, panic reactions of the driver are characterized by a typically limited, relatively brief actuation of the pedals with high force; such panic reactions are distinguished from conscious driver responses on the basis of a correspondingly higher duration of actuation of a pedal.

The minimum actuation time period over which a pedal in the vehicle must be actuated by the driver in order for a conscious driver response to be recognized and the automatic buildup of braking power to be terminated may either be established as a fixed time period or determined, depending on the situation, as a variable time period whose duration is a function of the variation over time of a driving state variable, in particular the vehicle speed. Various driver responses may be distinguished, either the fixed minimum actuation time period or the variable minimum actuation time period being used, depending on the driver response. Thus, for example, the fixed minimum actuation time period has proven to be sufficient when, during the automatic braking power intervention, the driver adequately actuates the brake pedal himself and thus generates braking power, actuates the gas pedal after a collision has occurred, and/or has already actuated the gas pedal before the collision occurs; in all of the above-mentioned situations the pedal must be actuated over the established minimum actuation time period in order to terminate the automatic braking intervention.

On the other hand, a variable determination of the minimum actuation time period is preferably used in driving situations when, in the event of a collision, the driver actuates both the gas pedal and the brake pedal, or uses the clutch pedal in addition to the gas pedal. In this case, the duration of this actuation depends on reaching a given value of a driving state variable, in particular the vehicle speed. Thus, it may be advantageous to terminate the automatic braking intervention when the referenced pedal actuation is carried out until the vehicle has reached a minimum speed. For this driving response it may be assumed with a high level of certainty that the driver intends to increase the vehicle speed.

However, in principle it is also possible to define a lower limit as the state variable value to be reached, for example a lower speed threshold below which the vehicle speed must drop in order for a conclusion to be drawn concerning a conscious driver response and for the automatic generation of braking power to be terminated. Furthermore, acceleration values of the longitudinal or transverse dynamics may be predefined, for example for the vehicle acceleration or deceleration, as driving state variables to be taken into account.

Taking into account minimum actuation time periods as a fixed time period or as a variable time period is established depending on the situation, so that both options may be concurrently implemented with the same priority in a brake system of a vehicle, and the fixed time period or the variable time period is activated only as the result of an appropriate driver response.

For a fixed as well as for a variable minimum actuation time period, the start of this time period may be established to be fixed or variable. The fixed start is established, for example, for a given point in time after a predetermined time period has elapsed following a moment of shock. The start of the variable depends on the variation over time of one or multiple state variables, for example the intersection point of the pressure rise curves which relate to actuation of the brake pedal by the driver and to the automatic buildup of braking power.

The actuation of a driving pedal must reach a defined minimum in order to be recognized at all by the system as actuation, whereupon, after evaluation, the automatic generation of braking power may possibly be terminated. In addition to the absolute level, the gradient of pedal actuation is considered as driving pedal actuation. For practical reasons, the pedal must be actuated at a minimum level so that a driver response is recognized which results in termination of the automatic buildup of braking power when the other conditions are present. The minimum level is established, for example, by the extent to which the pedal in question is moved by the driver from the neutral or starting position. However, taking into account the effect of pedal actuation, for example the extent of the buildup of braking pressure brought about by the driver, is also considered.

Taking the gradient into account may also be used as additional information for establishing a conscious termination of the automatic generation of braking power. Thus, for example, a very steep gradient is more indicative of a panic reaction than a gradient for pedal actuation having a somewhat flatter curve.

In addition, the maximum level of the driving pedal actuation may optionally be taken into account with regard to the termination of the automatic generation of braking power. It may thus be advantageous to carry out the termination only when the braking power level of the automatic generation of braking power is reached or exceeded via the brake pedal actuation.

DETAILED DESCRIPTION OF THE INVENTION

Figure 1:
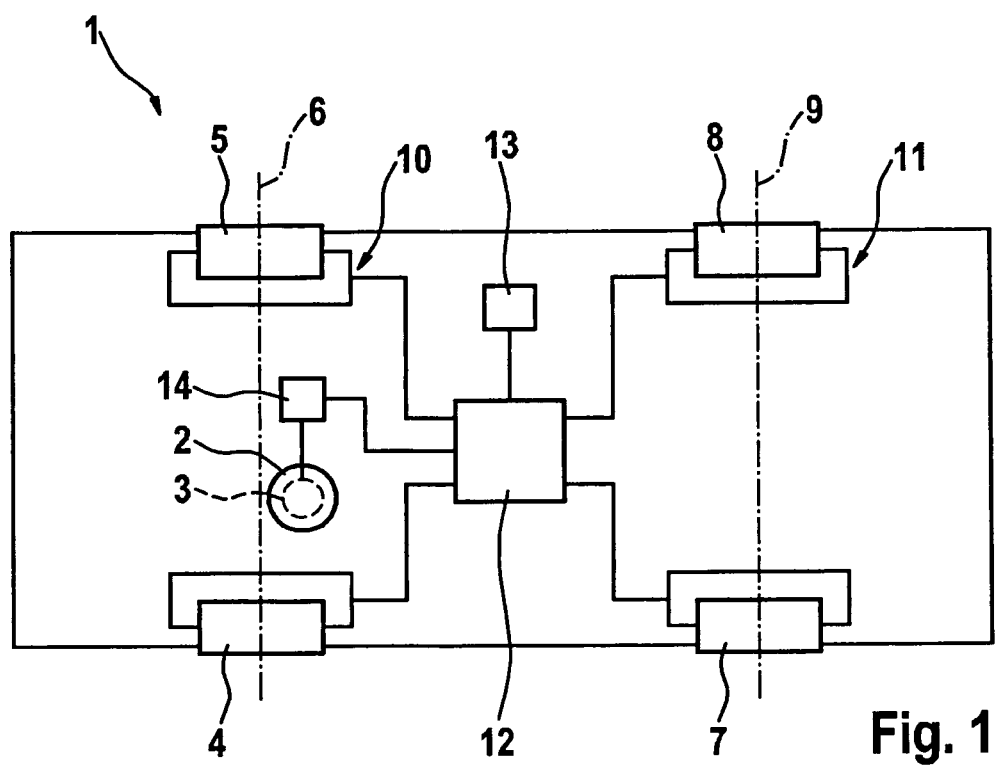
FIG. 1 shows a schematic illustration of a motor vehicle which is provided with front and rear brake units, and with a regulation and control device for adjusting the brake units.

A motor vehicle 1 is schematically illustrated in FIG. 1. Motor vehicle 1 is controlled by actuating a steering wheel 2, an airbag 3 being integrated into steering wheel 2 and being deployed via actuating signals of an associated airbag control device 14. Motor vehicle 1 has a brake system which includes a front brake unit 10 and a rear brake unit 11, the brake units of front brake unit 10 acting on front wheels 4 and 5 which are rotatably supported on front axle 6, and the brake units of rear brake unit 11 acting on rear wheels 7 and 8 which are rotatably supported on rear axle 9. Hydraulic brakes, electrohydraulic brakes, electric motor brakes, or possibly electropneumatic brakes may be used as brake units, it also being possible for the type of brake for front and rear brake units 10 and 11, respectively, to differ from one another.

Brake units 10 and 11 are adjusted via actuating signals of a regulation and control device 12, which may be an ESP control device. Regulation and control device 12 is connected to airbag control device 14 via data lines, for example a CAN bus. Regulation and control device 12 also receives sensor signals from a sensor system 13 via which driving state variables of the longitudinal and/or transverse dynamics may preferably be ascertained, for example the vehicle longitudinal speed, the longitudinal acceleration, the transverse acceleration, the yaw rate, or the wheel slip. Additionally or alternatively, sensor system 13 may include an environmental sensor system via which the environment of motor vehicle 1 is detected, for example the distance and the relative speed with respect to a preceding vehicle. Radar-assisted sensors, LIDAR sensors, optical sensors, or ultrasonic sensors are suitable as environmental sensor systems.

In the event of a collision of motor vehicle 1 with another vehicle or some other object, actuating signals for automatically building up braking power in brake units 10 and 11 are generated in regulation and control device 12 in order to reduce the severity of the consequences of an accident as a result of this automatic buildup of braking power. In principle, braking power is automatically built up independently of actuation of the brake pedal by the driver. However, the automatic buildup of braking power is also possible for the case that the brake pedal is actuated by the driver, the automatic buildup of braking power preferably taking place at an earlier point in time, so that delays in the buildup of braking power brought about by the driver may be compensated for by the automatic buildup of braking power.

To allow the driver to have the greatest degree of autonomy with regard to control of the vehicle, certain driving situations are established in which the driver, via a response, may terminate the automatic buildup of braking power. In FIGS. 2 through 6 below, a total of five different driving situations of this type are described which result in termination of the automatic buildup of braking power.

Figure 2:
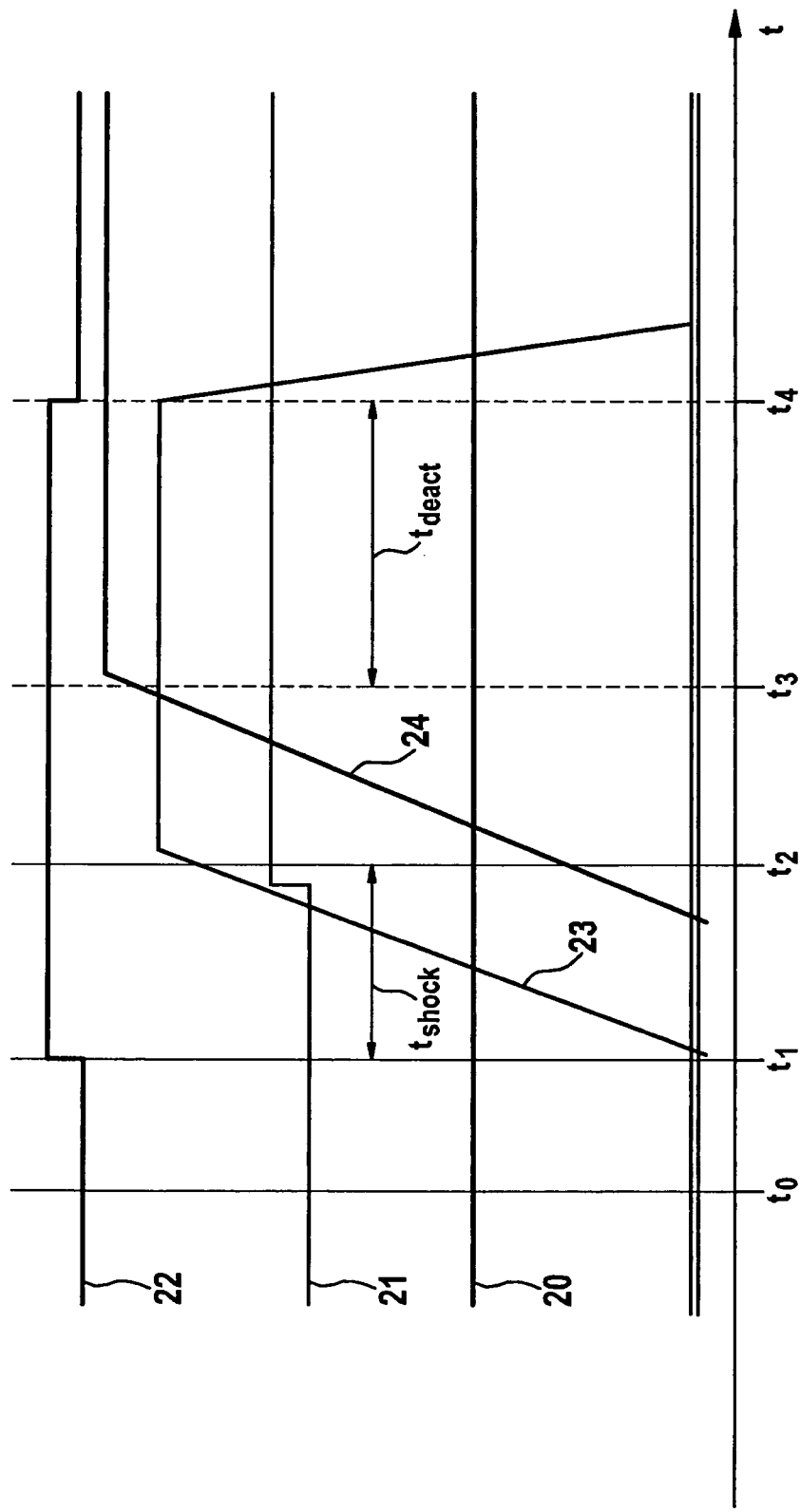
FIG. 2 shows a diagram of various curves of pedal actuations and automatically generated braking power as a function of time, illustrated for the case that the automatically generated braking power is terminated by a sufficient actuation of the brake by the driver.

In FIG. 2 the abscissa represents time t. A collision of the vehicle occurs at point in time $t_0$. At this point in time $t_0$, the accelerator pedal according to curve 20 as well as the brake pedal according to curve 21 are in the unactuated state. Curve 22 represents the variation over time of the activity of the system for automatically building up braking power (secondary collision mitigation (SCM)). According to curve 22, the SCM system for automatically building up braking power is also in the unactuated state at point in time $t_0$ at which the collision occurs.

The SCM system for automatically building up braking power is activated at next point in time $t_1$. Accordingly, at point in time $t_1$ the progression of curve 22 increases to a higher value which represents the activation state. At the same time, as a result of the brake actuation via the SCM system, the brake pressure increases according to curve 23 until a maximum value is reached.

The maximum brake pressure, which is adjusted by the SCM system, is reached shortly after a further point in time $t_2$. The time period between $t_1$ and $t_2$ is defined as the moment of shock, and in FIG. 2 is denoted as $t_{shock}$; pedal actuations performed by the driver in this phase are ignored with regard to a possible termination of the automatic buildup of braking power. In the exemplary embodiment according to FIG. 2, the brake pedal is actuated by the driver according to curve 21 shortly before point in time $t_2$ is reached. However, this brake pedal actuation has no effect on the termination of the automatic generation of braking power, even when, as a result of the brake pedal actuation, the brake pressure brought about by the driver increases according to curve 24.

Driver responses with regard to a possible termination of the automatic buildup of braking power are not taken into account until a point in time $t_3$, which represents an intersection point of pressure curves 23 and 24, which relate to the SCM system and the driver, respectively. The maximum braking power level achieved by the driver as a result of the brake pedal actuation is reached shortly after point in time $t_3$. If this braking power level is maintained until point in time $t_4$, the automatic generation of braking power via the SCM system is terminated as illustrated in the exemplary embodiment according to FIG. 2, whereupon the pressure curve according to curve 23 drops to zero. The time period between $t_3$ and $t_4$ is referred as $t_{deact}$, which is a minimum actuation time period over which the brake pedal actuation must be maintained by the driver, specifically, at a brake pressure which is greater than the brake pressure generated by the SCM system. If this is the case, as illustrated in FIG. 2, the automatic generation of braking power is terminated.

In FIGS. 3 through 6 below, points in time $t_0$ through $t_4$ represented therein have the same meanings as in the exemplary embodiment according to FIG. 2. In addition, the curves are provided with the same reference characters, so that reference is made to the description of FIG. 2 for the meaning of the various curves.

Figure 3:
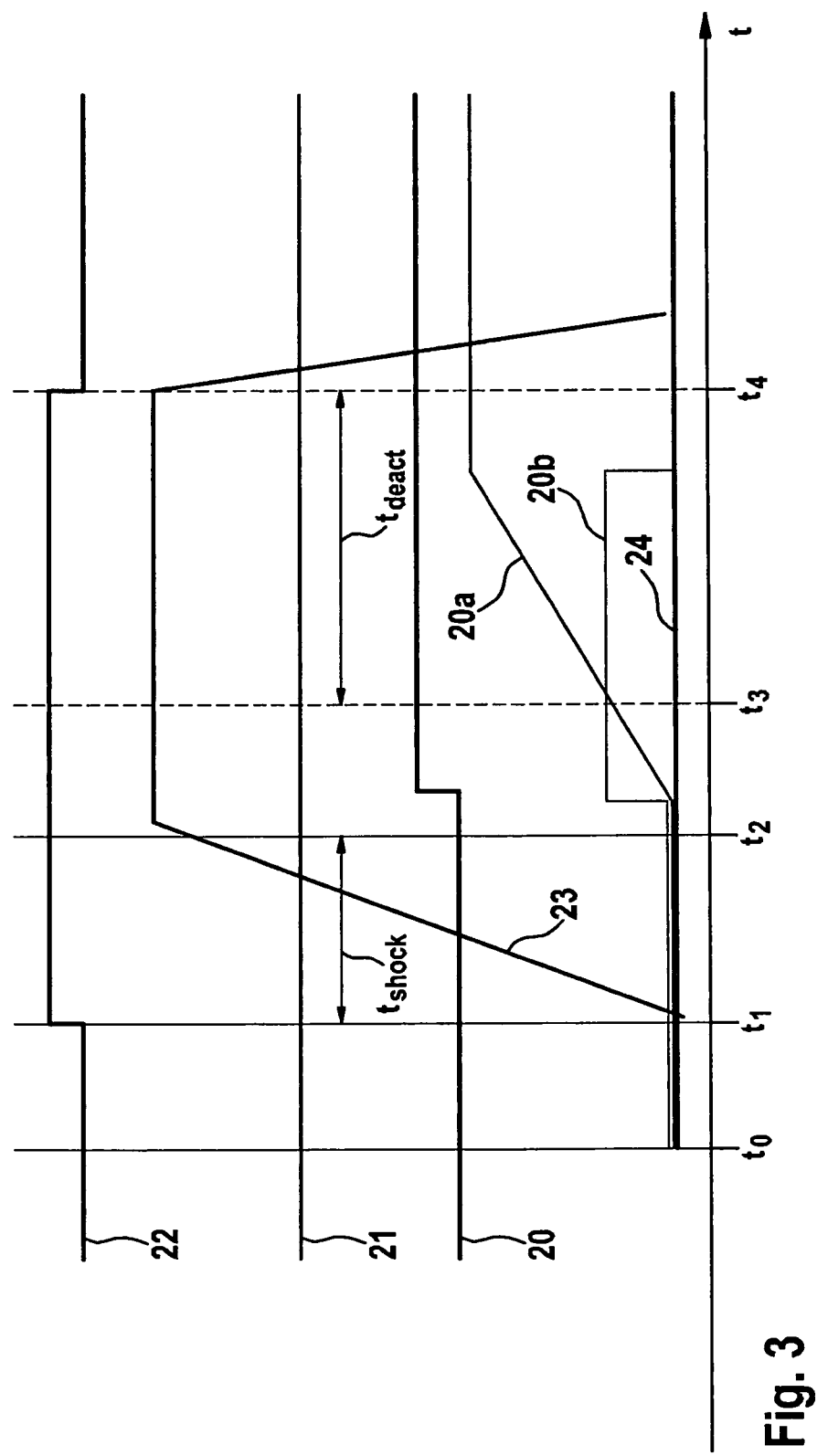
FIG. 3 shows a further diagram for the case that the automatically generated braking power is activated by actuating the accelerator pedal after a collision, and also during a simultaneous automatic braking intervention.

FIG. 3 illustrates the situation in which the driver actuates the accelerator pedal after a collision has occurred at point in time $t_0$, and after minimum time period $t_{shock}$ between points in time $t_1$ and $t_2$ according to curve signal progression 20 has elapsed. Reference numeral 20a represents the displacement path of the gas pedal actuation, and curve 20b shows the gradient for displacement path 20a. The brake pedal remains unactuated, and curve signal progression 24 for the brake pedal accordingly has a constant value of zero.

The same as in the preceding exemplary embodiment, minimum actuation time period $t_{deact}$ between points in time $t_3$ and $t_4$ indicates the time period over which pedal actuation must be maintained so that the automatic generation of braking power is terminated by the SCM system at point in time $t_4$. The accelerator pedal is actuated according to curves 20, 20a, and 20b before reaching point in time $t_3$, which represents the start of minimum actuation time period $t_{deact}$. The actuation of the accelerator pedal is maintained between $t_3$ and $t_4$.

Points in time $t_3$ and $t_4$, which respectively represent the start and the end of minimum actuation time period $t_{deact}$, are established as fixed values. For example, start $t_3$ is determined by the end of moment of shock $t_{shock}$ at point in time $t_2$. The end at point in time $t_4$ is established by the predefined duration of minimum actuation time period $t_{deact}$.

In the exemplary embodiment according to FIG. 3, the accelerator pedal according to curve 20 has not been actuated by the driver until the collision occurs at point in time $t_0$. In contrast, in the exemplary embodiment according to FIG. 4 the driving situation is illustrated in which the accelerator pedal has already been actuated by the driver before the collision occurs at point in time $t_0$, which is apparent from curve 20 in FIG. 4, which shows a rise in the actuation prior to $t_0$. The actuation of the accelerator pedal is maintained according to curve 20, in particular during the moment of shock in time period $t_{shock}$ as well as in minimum actuation time period $t_{deact}$ so that the conditions for deactivation of the SCM system are also met. Accordingly, the automatic generation of braking power is terminated at point in time $t_4$, as shown by curve 22.

Figure 4:
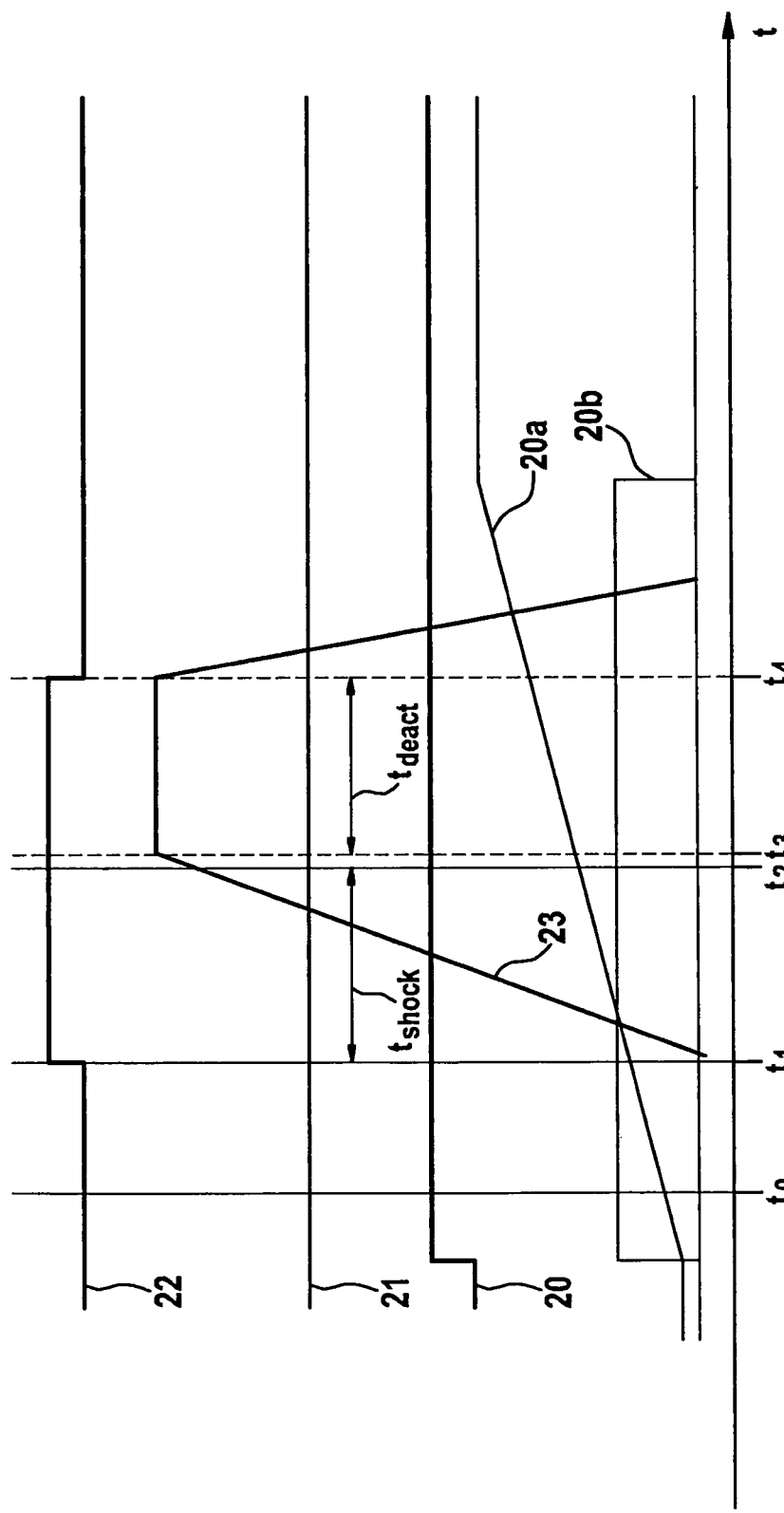
FIG. 4 shows a diagram illustrating the case that the driver has already actuated the accelerator pedal before the collision.

In both FIG. 3 and FIG. 4 the actuation of the accelerator pedal according to curve 20a increases monotonically over the entire time period under observation; i.e., the actuation is not discontinued, and instead increases or remains at an attained level.

Figure 5:
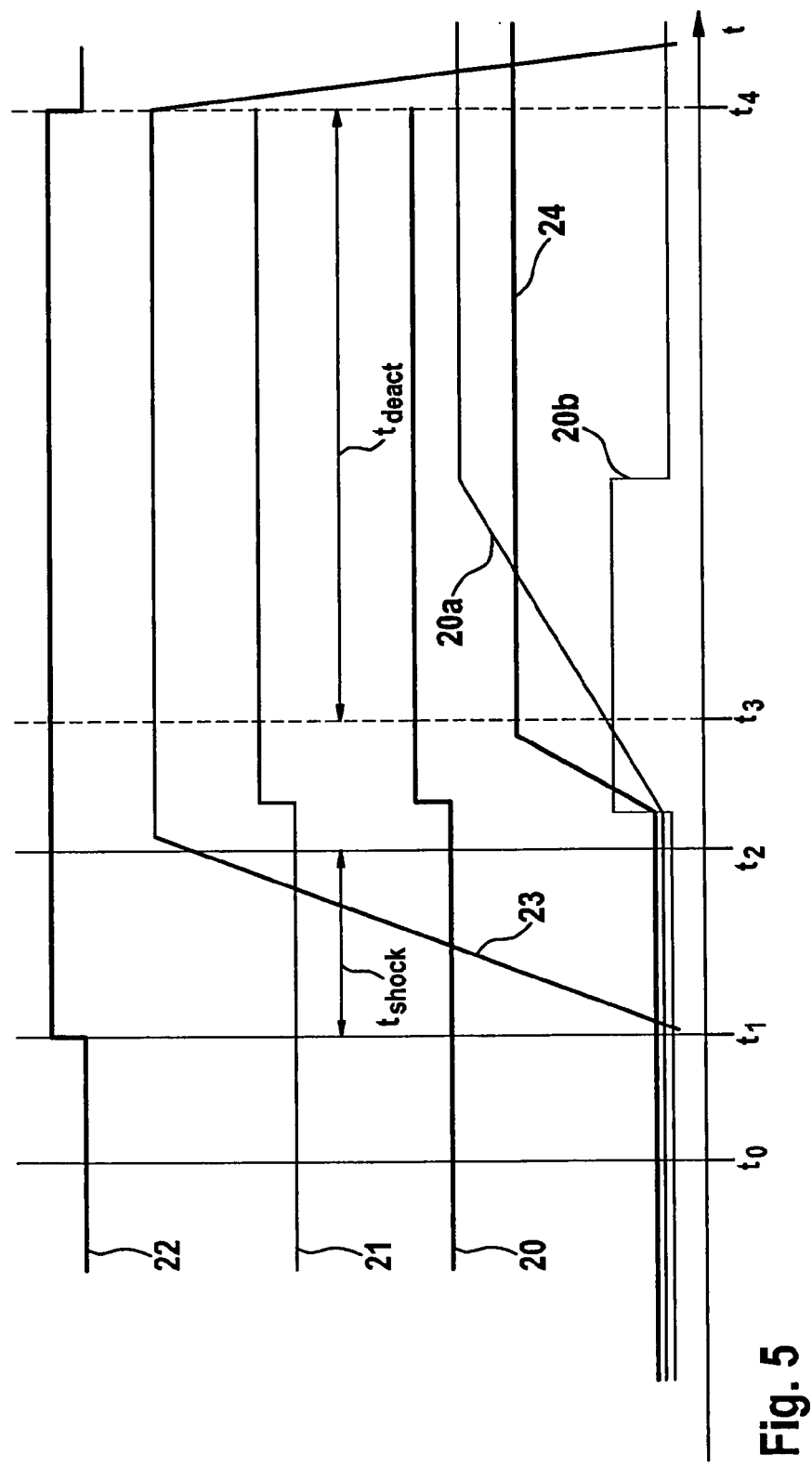
FIG. 5 shows a diagram for the case that the driver actuates both the accelerator pedal and the brake pedal for terminating the automatic buildup of braking power.

In the exemplary embodiment according to FIG. 5, the driver actuates both the accelerator pedal and the brake pedal, as shown by curves 20 and 21. The actuation takes place simultaneously, in particular between points in time $t_2$ and $t_3$, i.e., after moment of shock $t_{shock}$ has elapsed. As a result of the actuation of the brake pedal by the driver, the brake pressure brought about by the driver also increases according to curve 24. Approximately at the time that the maximum brake pressure is reached according to curve 24, deactivation or minimum actuation time period $t_{deact}$, whose duration up to point in time $t_4$ is not fixed, but, rather, depends on reaching a certain value of a driving state variable, begins at point in time $t_3$. The exemplary embodiment involves the vehicle speed; point in time $t_4$ and therefore the end of deactivation time period $t_{deact}$ is reached when the vehicle speed attains a threshold or minimum value. This terminates the automatic generation of braking power via the SCM system, which is also apparent from curve 22.

Figure 6:
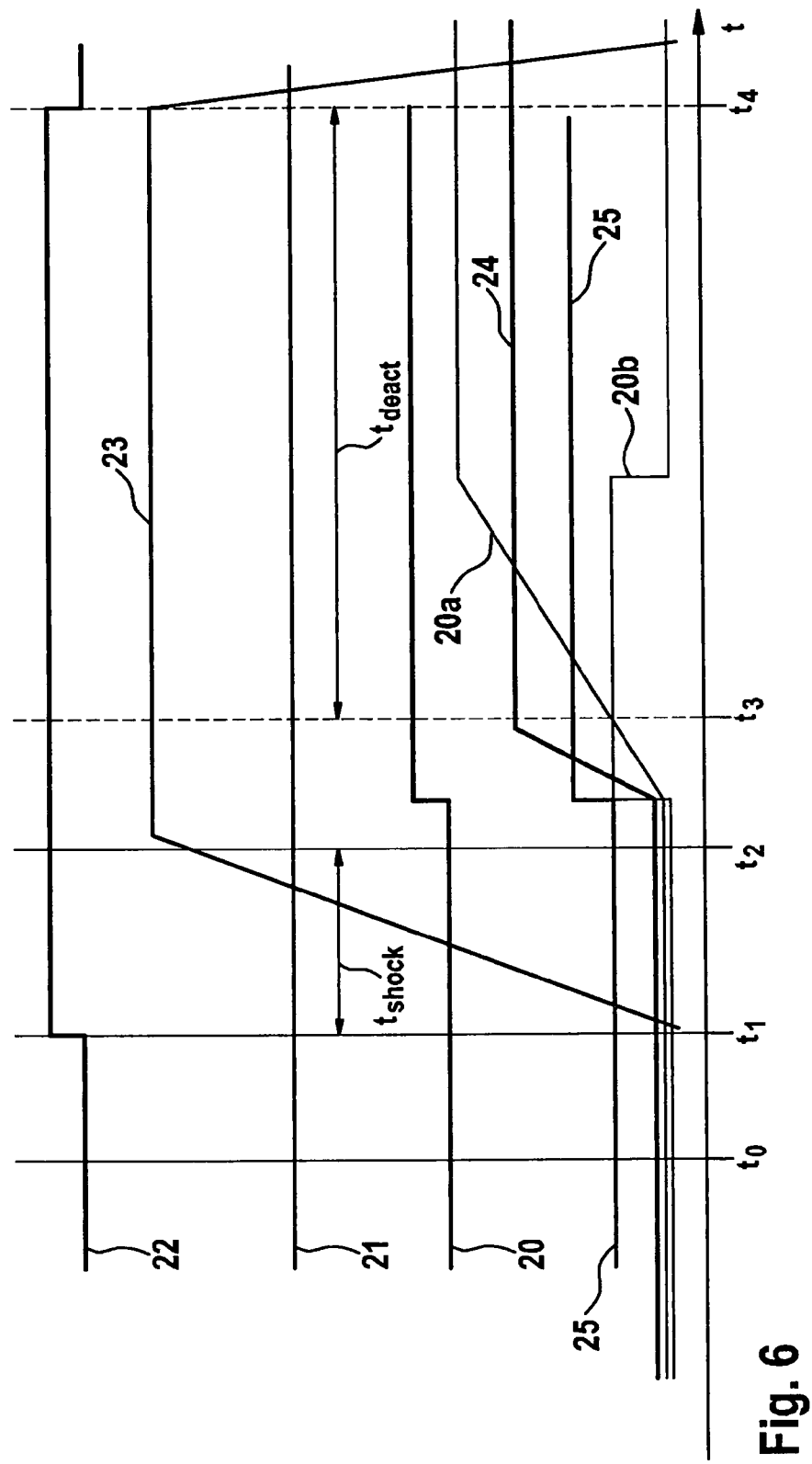
FIG. 6 shows a diagram for the case that the driver actuates both the accelerator pedal and the clutch pedal for terminating the automatic generation of braking power.

FIG. 6 illustrates the situation in which the driver actuates both the accelerator pedal according to curve 20 and the clutch pedal according to curve 25. The activation starts in the time period between points in time $t_2$ and $t_3$, i.e., after moment of shock $t_{shock}$ has elapsed. Both pedals are actuated at the same time, and the actuation is maintained past point in time $t_4$. The start of the deactivation or minimum actuation time period $t_{deact}$ at point in time $t_3$ coincides with the reaching of the maximum brake pressure brought about by the driver, according to curve 24. The same as in the preceding exemplary embodiment, the end of deactivation time period $t_{deact}$ at point in time $t_4$ is reached as soon as a driving state variable has attained an associated minimum or threshold value, for example when the actual vehicle speed assumes an associated minimum value. As a result, the automatic generation of braking power is terminated by the SCM system.

The termination of the automatic generation of braking power is advantageously limited to the above-mentioned driver responses. Therefore, other driver responses do not result in termination of the automatic generation of braking power which is carried out by the SCM system.

What is claimed is:

1. A method for controlling a brake system of a vehicle, comprising:
   automatically building up braking power of the brake system in the event of a collision of the vehicle; and
   terminating the automatic buildup of the braking power if a defined driver response occurs, wherein the defined driver response includes the actuation of a driving pedal of the vehicle at a defined intensity and for a defined minimum actuation time period.

2. The method as recited in claim 1, wherein a fixed time period is established as the minimum actuation time period.

3. The method as recited in claim 1, wherein the minimum actuation time period is a variable time period having a duration which is variable as a function of variation over time of a driving state variable.

4. The method as recited in claim 3, wherein the driving state variable to be taken into account must reach a defined minimum level.

5. The method as recited in claim 4, wherein the driving state variable to be taken into account is the vehicle speed.

6. The method as recited in claim 1, wherein the gradient of the driving pedal actuation is taken into account in terminating the automatic buildup of the braking power.

7. The method as recited in claim 1, wherein the maximum level of the driving pedal actuation is taken into account in terminating the automatic buildup of the braking power.

8. The method as recited in claim 1, wherein the driving pedal must be actuated at least at a defined minimum level in order to terminate the automatic buildup of braking power.

9. The method as recited in claim 1, wherein actuation of the brake pedal is taken into account in terminating the automatic buildup of braking power.

10. The method as recited in claim 1, wherein actuation of a clutch pedal is taken into account in terminating the automatic buildup of braking power.

11. The method as recited in claim 1, wherein the terminating of the automatic buildup of braking power occurs after a defined period of time following the defined driver response.

12. The method as recited in claim 1, wherein:
   a moment of shock corresponds to a predetermined time period starting at a first time after a start of the collision and ending at a second time after the start of the collision, and
   the actuation of the drive pedal is taken into account in terminating the automatic buildup of the braking power if the actuation of the drive pedal one of starts after the moment of shock and continues after the moment of shock.

13. A control system for controlling a brake system of a vehicle, comprising:
   a control unit configured to:
      automatically build up braking power of the brake system in the event of a collision of the vehicle; and
      terminate the automatic buildup of the braking power if a defined driver response occurs, wherein the defined driver response includes the actuation of a driving pedal of the vehicle at a defined intensity and for a defined minimum actuation time period.

14. The control system as recited in claim 13, wherein braking power is automatically built up via actuating signals of an ESP control device.

15. The control system as recited in claim 13, wherein:
   a moment of shock corresponds to a predetermined time period starting at a first time after a start of the collision and ending at a second time after the start of the collision, and
   the control unit is configured to take into account the actuation of the drive pedal in terminating the automatic buildup of the braking power if the actuation of the drive pedal one of starts after the moment of shock and continues after the moment of shock.

* * * * *

UNITED STATES PATENT AND TRADEMARK OFFICE
CERTIFICATE OF CORRECTION

PATENT NO. : 8,706,372 B2
APPLICATION NO. : 12/998361
DATED : April 22, 2014
INVENTOR(S) : Cetinkaya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this
Twenty-ninth Day of September, 2015

Michelle K. Lee
*Director of the United States Patent and Trademark Office*